Patented Mar. 14, 1939

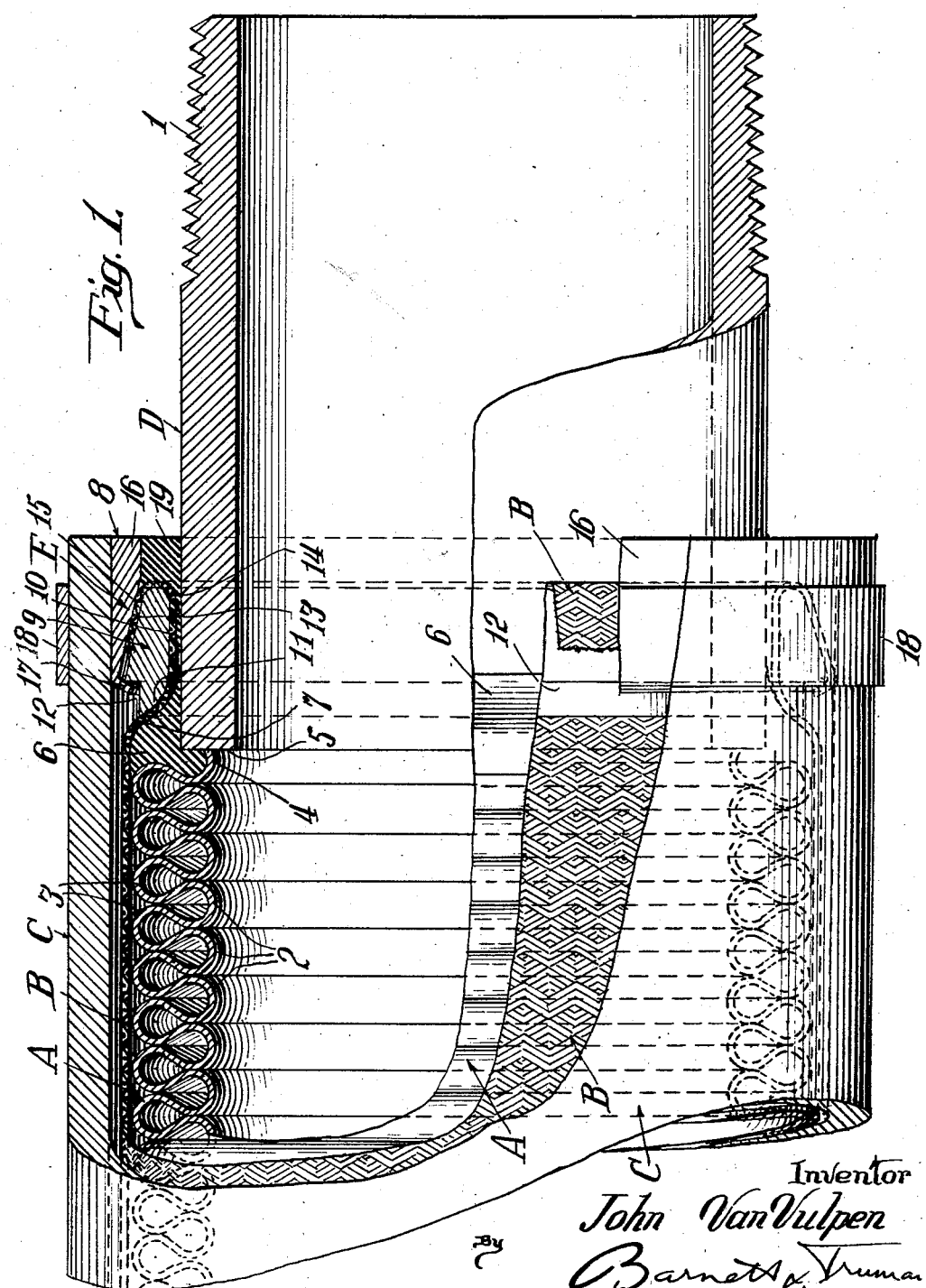

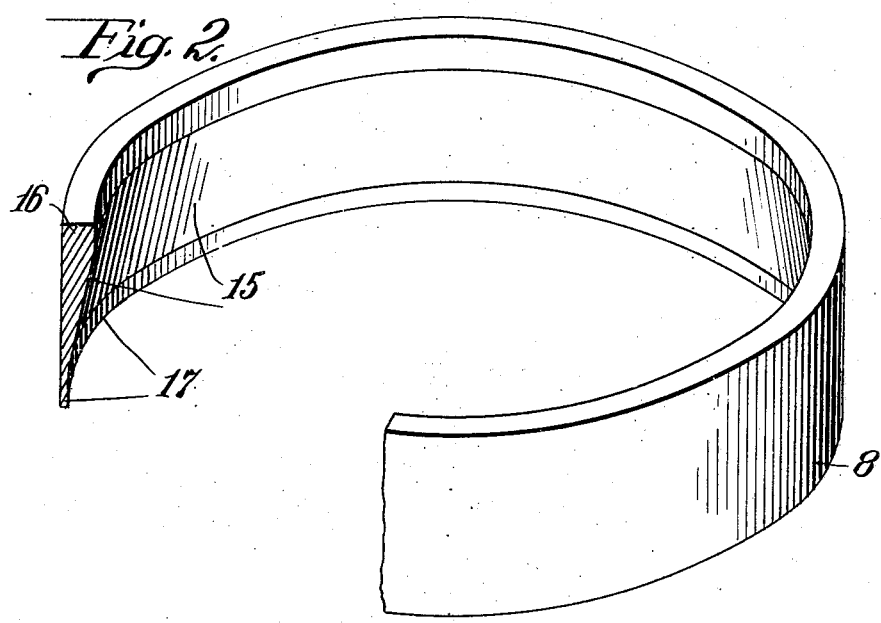
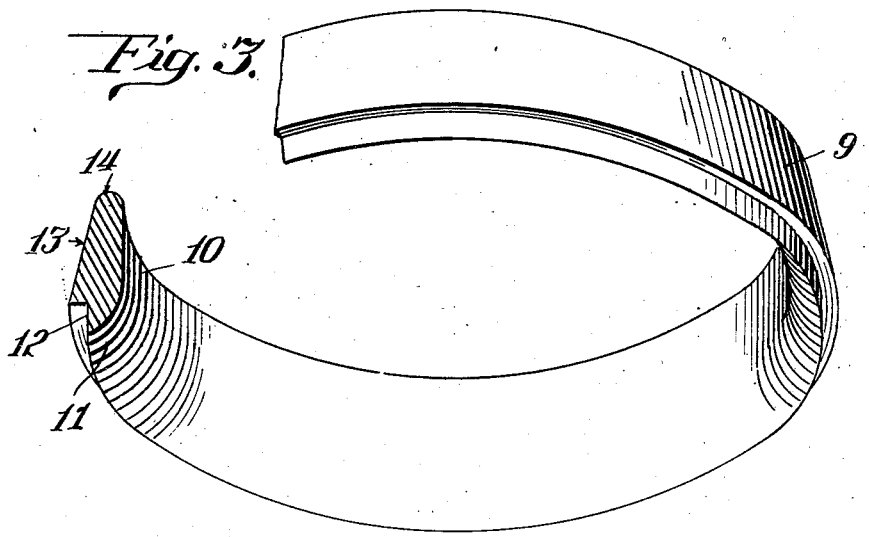

2,150,471

UNITED STATES PATENT OFFICE 2,150,471

FLEXIBLE METALLIC HOSE

John Van Vulpen, Chicago, Ill., assignor to Vapor Car Heating Company, Inc., Chicago, Ill., a corporation of New York Application July 15, 1937, Serial No. 153,792

5 Claims. (Cl. 285—72)

This invention relates to certain new and useful improvements in a flexible metallic hose adapted to be fluid-tight, withstand high internal pressures and be externally protected against exposure and abuse.

The inner portion of the hose is formed by an imperforate metallic tubing of corrugated or bellows form so as to provide the desired flexibility. The end portion of this tubing is permanently secured to the rigid tubular nipple at the end of the hose section. In order to provide the necessary strength the inner flexible tubing is enclosed by a braided wire tubing, and the present invention is particularly concerned with an improved means for securing in place the end portion of this braided wire tubing beyond the end of the inner bellows tubing and about the nipple. More specifically, the end portion of the braided wire tubing is folded around an inner clamping ring over which an outer clamping ring is wedged, and the entire assembly is suitably enclosed and protected from the weather.

The general object of this invention is to provide an improved flexible hose of the type hereinabove briefly described and disclosed more in detail in the specifications which follow.

Another object is to provide improved means for securing the end portion of the braided wire tubing in a flexible metallic hose.

Another object is to provide an improved form of clamping device for use in a flexible metallic hose assembly.

Other objects and advantages of this invention will be more apparent from the following detailed description of one approved form of the invention.

In the accompanying drawings:

Fig. 1 is an elevation, partially broken away, so that the upper portion is shown in central longitudinal vertical section, of the end portion of the improved assembly.

Fig. 2 is a perspective view, partially broken away, of the outer clamping ring.

Fig. 3 is a similar view of the inner clamping ring.

The flexible portion of the hose consists generally of the inner tubing A, the covering tubing B of braided wire, and preferably an outer protecting covering C of rubber hose or similar material. At its end portion the hose section comprises the rigid metallic nipple D and the improved clamping assembly E, by means of which the end portion of the braided tubing B is secured in place.

The heavy pipe nipple D, preferably of wrought iron, is suitably threaded at its forward end, as at 1, for connection with a suitable coupling member, and the rear portion of this nipple is of hollow cylindrical form and is secured to one end of the flexible tubing A. This member A is preferably formed of rather thin copper or steel tubing which is corrugated or folded back and forth on itself, as indicated in the drawings at 2 and 3, so as to form a bellows structure which may be bent considerably in any direction without injuring the metal. Of course this tubing is imperforate and absolutely fluid-tight. Since this hose may be used for carrying steam or other fluids under rather high pressures, it is necessary to reinforce this hose tubing A so as to withstand these high internal pressures and for this purpose the tubing A is enclosed by a stronger tubing B, preferably of braided wire, or similar meshed metallic construction.

The end 4 of the inner tubing A is permanently secured to the rear end 5 of the nipple by being brazed or welded or otherwise suitably bonded thereto, the bonding material 6 being of sufficiently high strength to withstand the internal pressures involved and form a permanent joint. It will be noted that the exterior diameter of the internal hose or tubing A is somewhat greater than the external diameter of nipple D, and an excess of the bonding material 6 will be used so that this may be machined or trimmed away so as to provide the inwardly sloping and preferably rounded outer surface 7 which curves inwardly from the maximum outer diameter of tubing A to the outer surface of nipple D. The end portion of the braided tubing B is drawn inwardly over this rounded surface 7 which has no sharp edges adapted to injuriously affect the braided tubing.

The improved clamping means E comprises a pair of cooperating clamping rings 8 and 9 which are shown in assembled relation in Fig. 1 and are shown separately in Figs. 2 and 3, respectively. The inner ring 9 has an inner substantially cylindrical surface 10 of somewhat greater diameter than the outer diameter of nipple D so that a portion of the braided wire tubing B may be interposed therebetween. The rear inner surface of ring 9 is curved rearwardly and upwardly at 11 to correspond with the curvature 7 of the brazing or bonding material 6. The upper rear end surface of ring 9 is notched or cut away at 12 for a purpose hereinafter explained. The outer surface of ring 9 is tapered rearwardly and outwardly, as indicated at 13, and the forward end of the ring is rounded at 14 so that the extreme end portion of the braided tubing B may be bent around this rounded end 14 and folded back over the tapered surface 13.

The outer ring 8 has an inner tapered surface 15 corresponding to the outer surface 13 of inner ring 9 so that this outer ring may be wedged over the inner ring to clamp therebetween the end portion of the braided tubing B. Preferably the ring 8 is of greater width than the overlapped portion of the inner ring 9 so that a cylindrical portion 16 of the outer ring will project forwardly beyond the front end of ring 9 and the rounded end of tubing B, and the thin inner end portion 17 of the outer ring may be bent inwardly over the notched portion 12 of the inner ring to lock the outer ring in its wedged position.

In forming the assembly as thus far described, the inner tubing A will first be brazed or similarly secured to the nipple D, and the outer surface of the bonding material 6 will be machined away, as already described. The braided tubing B is then pulled into position, and the inner ring 9 is driven into place over the nipple D and the end portion of the braided tubing and against the rounded surface 7 of the joint 6. The braided tubing B is then folded back over the inner ring 9 and the outer ring 8 is driven into wedged relation so as to lock the folded back portion of the braided covering in place, and the inner end 17 of the outer ring is then bent downwardly to lock the assembly in place.

This completes the essential metallic portion of the hose. However, it is preferable to use a covering hose C of rubber or similar material, this outer sleeve protecting the hose against abuse, flying ballast, or sand blasts, in the event this flexible metallic steam hose is used for steam connections between railroad cars. This rubber hose or sleeve C will preferably be of such an internal diameter as to fit snugly over the outer ring 8, the end portion of the hose being clamped in place by the annular clamping member 18 of any approved form.

It will be noted that the forward cylindrical end portion 16 of the outer ring 8 projects beyond the inner ring 9 so as to provide a space which is filled with cement 19 or other suitable packing or sealing material so as to completely protect the braided wire hose B from external atmospheric conditions. It will be noted that the packing 19, together with rubber hose C, completely encloses the metallic elements of the hose except for the projecting end portion of nipple D. That is no portion of the flexible tubings A or B are exposed in any way to external weather conditions.

It has been found that any method of securing the end of the braided tubing B in place which involves the use of heat has tended to weaken the braids. It will be noted that no heat whatever is used to form the joint between the braided tubing and the remainder of the assembly. The only heating operation involved is that used in forming the bonded joint 6 and this is done before the braided tubing B is applied.

It will be understood that as far as the construction of the hose proper is concerned, a considerable range of equivalents might be substituted without departing from the scope of this invention. The inner tubing A need not be made of the specific form herein disclosed so long as it is imperforate and has the desired flexibility. Any suitable type of bonding material may be used at 6 so long as the necessary strength and permanency is provided at this joint. The braided wire covering B may be made of any suitable metallic form so long as the required strength and flexibility is provided, it not being essential that this tubing be fluid-tight. The outer sheathing C, while described as rubber hose, may be made of any suitable material adapted to protect the inner metallic tubing against blows, moisture, and weather conditions in general. It is to be understood that the term "rubber" as used herein and in the claims is to be considered as covering such possible substitutes.

I claim:

1. In combination in a flexible hose, a metallic nipple, an imperforate corrugated metallic tubing, a tubular braided wire covering fitted about the corrugated tubing, and an annular metallic clamping device, the end of the corrugated tubing being permanently connected to the nipple to form a joint of greater diameter than the outer diameter of the nipple, the clamping device comprising a pair of rings adapted to wedge over one another and fit about the nipple beyond the joint, the end portion of the braided covering extending over the joint and between the inner ring and the outer surface of the nipple and being folded back over the inner ring and clamped in place between the two wedged rings.

2. In combination in a flexible hose, a metallic nipple, an imperforate corrugated metallic tubing, a tubular braided wire covering fitted about the corrugated tubing, and an annular metallic clamping device, the end of the corrugated tubing being permanently connected to the nipple to form a joint of greater diameter than the outer diameter of the nipple, the clamping device comprising a pair of rings adapted to wedge over one another and fit about the nipple beyond the joint, the end portion of the braided covering extending over the joint and between the inner ring and the outer surface of the nipple and being folded back over the inner ring and clamped in place between the two wedged rings, a rubber hose enclosing the braided tubing, and means for clamping the end portion of the rubber hose to the outer ring.

3. In combination in a flexible hose, a metallic nipple having a substantially hollow cylindrical rear end portion, an imperforate corrugated metallic tubing having its outer end portion fixedly sealed to the rear end portion of the nipple so as to provide an outer surface at the joint sloping inwardly and forwardly toward the outer surface of the nipple, a tubular braided metallic wire covering fitted about the corrugated tubing with the end of the braided tubing extending forwardly over the sloping surface at the joint, an annular metallic coupling comprising two overlapping rings, the inner ring having an outer tapered surface over which a correspondingly tapered surface inside the outer ring is adapted to be wedged, the inner ring being fitted over the nipple and braided covering with its rear end internally sloped to correspond with and fit against the sloped surface at the joint with the braided tubing interposed therebetween, the outer end portion of the braided covering being folded back over the inner ring and the outer ring wedged in place over this end portion and the inner ring.

4. In combination in a flexible hose, a metallic nipple having a substantially hollow cylindrical rear end portion, an imperforate corrugated metallic tubing having its outer end portion fixedly sealed to the rear end portion of the nipple so as to provide an outer surface at the joint sloping inwardly and forwardly toward the outer surface of the nipple, a tubular braided metallic wire covering fitted about the corrugated tubing with the end of the braided tubing extending forwardly over the sloping surface at the joint, an annular metallic coupling comprising two overlapping rings, the inner ring having an outer notched portion and an outer tapered surface over which a correspondingly tapered surface inside the outer ring is adapted to be wedged, the inner ring being fitted over the nipple and braided covering with its rear end internally sloped to correspond with and fit against the sloped surface at the joint with the braided tubing interposed therebetween, the outer end portion of the braided covering being folded back over the inner ring and the outer ring wedged in place over this end portion and the inner ring, the outer ring having a thin rear end portion which is bent inwardly to engage the notched portion of the inner ring and lock the outer ring in place.

5. In combination in a flexible hose, a metallic nipple having a substantially hollow cylindrical rear end portion, an imperforate corrugated metallic tubing having its outer end portion brazed to the rear end of the nipple, the outer surface of the brazing material being rounded to slope inwardly from a greater diameter toward the outer surface of the nipple, a tubular braided metallic wire covering fitted about the corrugated tubing with the end of the braided tubing extending inwardly over the sloping surface of the brazing material, an annular metallic coupling comprising two overlapping rings, the inner ring having an outer tapered surface over which a correspondingly tapered surface inside the outer ring is adapted to be wedged, the inner ring being fitted over the nipple and the braided covering with its rear end internally sloped to correspond with and fit against the sloped surface of the brazing material with the braided tubing interposed therebetween, the outer end portion of the braided covering being folded back over the inner ring and the outer ring being wedged in place over this end portion and the inner ring.

JOHN VAN VULPEN.